(12) United States Patent
Sreekanth (10) Patent No.: US 8,073,857 B2
(45) Date of Patent: Dec. 6, 2011

(54) SEMANTICS-BASED DATA TRANSFORMATION OVER A WIRE IN MASHUPS

(75) Inventor: Kannepalli V. Sreekanth, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 12/371,989

(22) Filed: Feb. 17, 2009

(65) Prior Publication Data

US 2010/0211580 A1 Aug. 19, 2010

(51) Int. Cl.
*G06F 7/00* (2006.01)
(52) U.S. Cl. .................... 707/756; 709/246; 715/700
(58) Field of Classification Search .................. 707/756; 709/246; 715/700
See application file for complete search history.

(56) References Cited

U.S. PATENT DOCUMENTS

| | | | |
|---|---|---|---|
| 7,908,278 B2 * | 3/2011 | Akkiraju et al. | 707/748 |
| 2006/0026094 A1 * | 2/2006 | Oral et al. | 705/38 |
| 2006/0064422 A1 * | 3/2006 | Arthurs et al. | 707/10 |
| 2006/0212836 A1 | 9/2006 | Khushraj et al. | |
| 2007/0209013 A1 | 9/2007 | Ramsey et al. | |
| 2008/0201326 A1 * | 8/2008 | Cotter et al. | 707/5 |
| 2009/0100407 A1 * | 4/2009 | Bouillet et al. | 717/105 |
| 2009/0193148 A1 * | 7/2009 | Jung et al. | 709/246 |
| 2010/0037157 A1 * | 2/2010 | Chang et al. | 715/764 |

OTHER PUBLICATIONS

Hoyer et al., 2008 IEEE International Conference on Services Computing, pp. 601-602, 2008.*
Beletski, O., End User Mashup Programming Envirnments, Helsinki University of Technology, pp. 1-13, 2008.*
Lorenzo et al., Mashups for Data Integration: An Analysis, Technical Report UNSW-CSE-TR-0810, Apr. 2008, pp. 1-25.*
Eetu, Mäkelä, et al. Enabling the Semantic Web with Ready-to-Use Web Widgets. Proceedings of the First Industrial Results of Semantic Technologies Workshop, ISWC2007, Nov. 11, 2007.

* cited by examiner

*Primary Examiner* — Cheyne Ly
(74) *Attorney, Agent, or Firm* — Cantor Colburn LLP; Daniel McLoughlin (57) ABSTRACT

A method of sharing data between wired properties associated with disparate data types includes receiving a first specification for dividing data items having a first data type published by an output property of a first service task into a first set of sub-units and a second specification for dividing data items having a second data type consumed an input property of a second service task into a second set of sub-units; receiving transformation logic for transforming data items divided into the first set of sub-units to data items divided into the second set of sub-units; dividing a first data item published by the output property into the first set of sub-units; applying the transformation logic to transform the divided first item to a second data item divided into the second set of sub-units; and joining the divided second data item. The service tasks are registered with an aggregation application that includes a wire between the properties.

20 Claims, 5 Drawing Sheets

```
<part name="Address" type="xsd:String" template="Line1, Line2, State - ZipCode"/>
```

```
<part name="SalesAddress" type="xsd:String" template="Address1, Address2"/>
```

Figure 1

```
<part name="AccountID" type="xsd:String" template="AAA99999"/>
```

Figure 2a

```
<part name="Address" type="xsd:String" template="Line1, Line2, State - ZipCode"/>
```

Figure 2b

```
<types>
          <xsd:schema targetNamespace="com.ibm.compositeapps.samples">
                    <xsd:simpleType name="AddressType">
                              <xsd:restriction base="xsd:string" template=
                              "Line1, Line2, State - ZipCode"/>
                    </xsd:simpleType>
          </xsd:schema>
</types>

<message name="OnViewEntrySelectionChange_Property_Operation_Output">
          <part name="Address" type="cus:AddressType"/>
</message>
```

Figure 2c

```
<part name="Address" type="xsd:String" template="Line1, Line2, State - ZipCode"/>
```

Figure 3a

```
<part name="SalesAddress" type="xsd:String" template="Address1, Address2"/>
```

Figure 3b

```
<wire id="TMP_10016" ordinal="0">
    <object-id value="10_5JMPDRH10GV000262ESRCB2845"/>
    <source-info portletEntityRef="TMP_10006" property="Address"/>
    <target-info action="UpdateSalesHistoryUI" param="SalesAddress"
    portletEntityRef="TMP_10015" transformation="Line1:Address1, Line2:Address2"/>
</wire>
```

Figure 3c

```
<part name="Address" type="xsd:String" template="Line1, Line2, State - ZipCode"/>
```

Figure 4a

```
<part name="SalesAddress" type="xsd:String" template="Address1, Address2"/>
```

Figure 4b

```
<Address>
        <Line1/>                            <SalesAddress>
        <Line2/>                                <Address1/>
        <State/>                                <Address2/>
        <ZipCode/>                          </SalesAddress>
</Address>
```

SEMANTICS-BASED DATA TRANSFORMATION OVER A WIRE IN MASHUPS

BACKGROUND

Exemplary embodiments of the present invention relate to mashup software applications, and more particularly, to the assembly of different widgets to produce mashup software applications.

Service-oriented computing supports the notion of aggregating any number of modular, atomic software capabilities discoverable and usable by disparate organizations. For example, a mashup is a software application rendered in a browser that combines data and functionality from multiple distinct sources into a single, integrated tool providing a common view (for example, Web 2.0 applications). To support the creation of mashups, reusable widgets (or mashup components), which combine on-line data resources with server-side APIs and user interface functionalities in a compact package that can easily be re-used in other applications, have emerged. Widgets, which can also be combined together and published as new application components, provide atomic elements of mashup application functionality, and thereby can enable easy on the glass integration of otherwise very complicated or costly features to virtually any application. For example, mashups can be implemented to extend enterprise data with service components from the public internet such as Google Maps for location services, RSS (Really Simple Syndication) Feeds to publish content, or Widgets (web plug-ins) that provide specific functions such as blog, wiki, or social networking capabilities.

Generally, mashups are not intended to be strategic, systematically built, industrial-strength enterprise applications; rather, they are created quickly or opportunistically to meet a focused tactical need. Mashups are generally personalized to fulfill personal productivity needs rather than the requirements of a long-standing corporate role. Mashups leverage content and logic from other Web sites and Web applications, are lightweight in implementation, and are implemented using with a minimal amount of code (which can be, for example, client-side JavaScript™ or server-side scripting languages, such as PHP or Python).

Widgets exchange data using input and output properties. Each property is defined by a type and each type is associated with a data type. To participate in a mashup, each widget publishes the properties that it accepts as input and provides as output. More particularly, inter-widget communication in a mashup is achieved by "wiring" output properties of source widgets to input properties of target widgets, and a property broker manages the interactions between the widgets. Thus, interaction between widgets in mashups is loosely coupled. When the value of a property changes in the source widget, the target widget reacts to that change by executing the action to which the property is wired. The wiring interface allows developers to configure connections, or wires, between cooperative, heterogeneous widgets based on the input and output properties of the widgets to form more complex widgets or applications.

The loose coupling of coarse-grained widgets is a cornerstone of the mashup architecture. It enables diverse groups in different locations to leverage each other's efforts and to interoperate with each other. Each group needs to understand only the input and output properties for a widget and not the internal logic. Nevertheless, the use of communication between widgets in terms of data sent from output properties to input properties along a wire does not currently allow for widgets to be completely decoupled. In particular, wires presently cannot be formed in mashups unless both endpoints use the same data type. For example, two widgets may utilize the concept of a date, but unless the dates are identically defined (namespace, name, type), they cannot be connected.

SUMMARY

An exemplary embodiment of a method of sharing data between wired properties associated with disparate data types includes receiving a first specification for dividing data items having a first data type published by an output property of a first service task into a first set of atomic sub-units and a second specification for dividing data items having a second data type consumed an input property of a second service task into a second set of atomic sub-units; receiving a set of transformation logic for transforming data items divided into the first set of sub-units to data items divided into the second set of sub-units; dividing a first data item published by the output property over a wire between the output property and the input property into the first set of sub-units; automatically applying the set of transformation logic to transform the first item divided into the first set of sub-units to a second data item divided into the second set of sub-units; joining the divided second data item based on the second data type; and passing the second data item over the wire to the input property. The first and second service tasks are registered with a property broker coupled to a content aggregation application aggregating the first and second service tasks. The property broker further couples to a wiring scheme for the content aggregation application that includes the wire.

Exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention. As used herein, the singular forms "a", "an", and "the" are intended to include the plural forms as well, unless the content clearly indicates otherwise. It will be further understood that the terms "comprises", "includes", and "comprising", when used in this specification, specify the presence of stated features, integers, steps, operations, elements, components, and/or groups thereof.

Exemplary embodiments of the present invention can be implemented to provide a mechanism for enabling the different service tasks aggregated within content aggregation applications such as, for example, composite applications, mashup applications, and portal applications, to be completely decoupled. Exemplary embodiments can be implemented to provide a mechanism for defining the associated properties for values transmitted between two service tasks over a wire in terms of atomic sub-units for the two properties during assembly of the content aggregation application, and utilizing these sub-units definitions to perform data transformation on values transmitted over the wire between the two properties, thereby allowing for the two properties to be wired even where they do not share the same data type. Exemplary embodiments can thus be utilized to reduce implementation costs, enabling greater flexibility, and simplify integration when assembling service tasks for a content aggregation application.

As used herein, the terms "service" or "service task" can refer to any discrete, repeatable process used to encapsulate a functional unit of an application by providing an interface that is well-defined and implementation independent. The process can be an individual function or a collection of functions that together form a process. A service can be invoked (or consumed) by other services or client applications. As used herein, the term "composite application" refers to an aggregation of components that, when wired together, provide the ability for the components to communicate and interact with each other. As used herein, the terms "mashup", "mashup application", and the like can refer to a website, "Web 2.0 application," web service, domain, or similar content domain that uses content from more than one source to create a combined content item, such as a new website, new service, new application, or the like. As used herein, the term "widgets" includes small programs configured to perform specific functions and that can reside on a client computer system and/or a server computer system. Widgets can be configured, for example, to show the time, find the cheapest gas near a particular zip code, show the weather forecast near a city, find flights from a particular airline, show sports scores, compare prices on a particular product or service, and the like. The number of applications of widgets is virtually unlimited, both on the client and the server.

Exemplary embodiments of the present invention can implemented using one or more program modules and data storage units. As used herein, the term "modules", "program modules", "components", "systems", "tools", "utilities", and the like include routines, programs, objects, components, data structures, and instructions, or instructions sets, and so forth that perform particular tasks or implement particular abstract data types. As can be appreciated, the modules refer to computer-related entities that can be implemented as software, hardware, firmware and/or other suitable components that provide the described functionality, and which may be loaded into memory of a machine embodying an exemplary embodiment of the present invention. Aspects of the modules may be written in a variety of programming languages, such as C, C++, Java, etc. As used herein, the terms "data storage unit," "data store", "storage unit", and the like can refer to any suitable memory device that may be used for storing data, including manual files, machine readable files, and databases. The functionality provided by exemplary embodiments can be combined and/or further partitioned. The modules and/or storage units can all be implemented and run on the same computing system (for example, the exemplary computer system illustrated in FIG. 6 and described below) or they can be implemented and run on different computing systems. For example, one or modules can be implemented on a personal computer operated by a user while other modules can be implemented on a remote server and accessed via a network.

Figure 1:
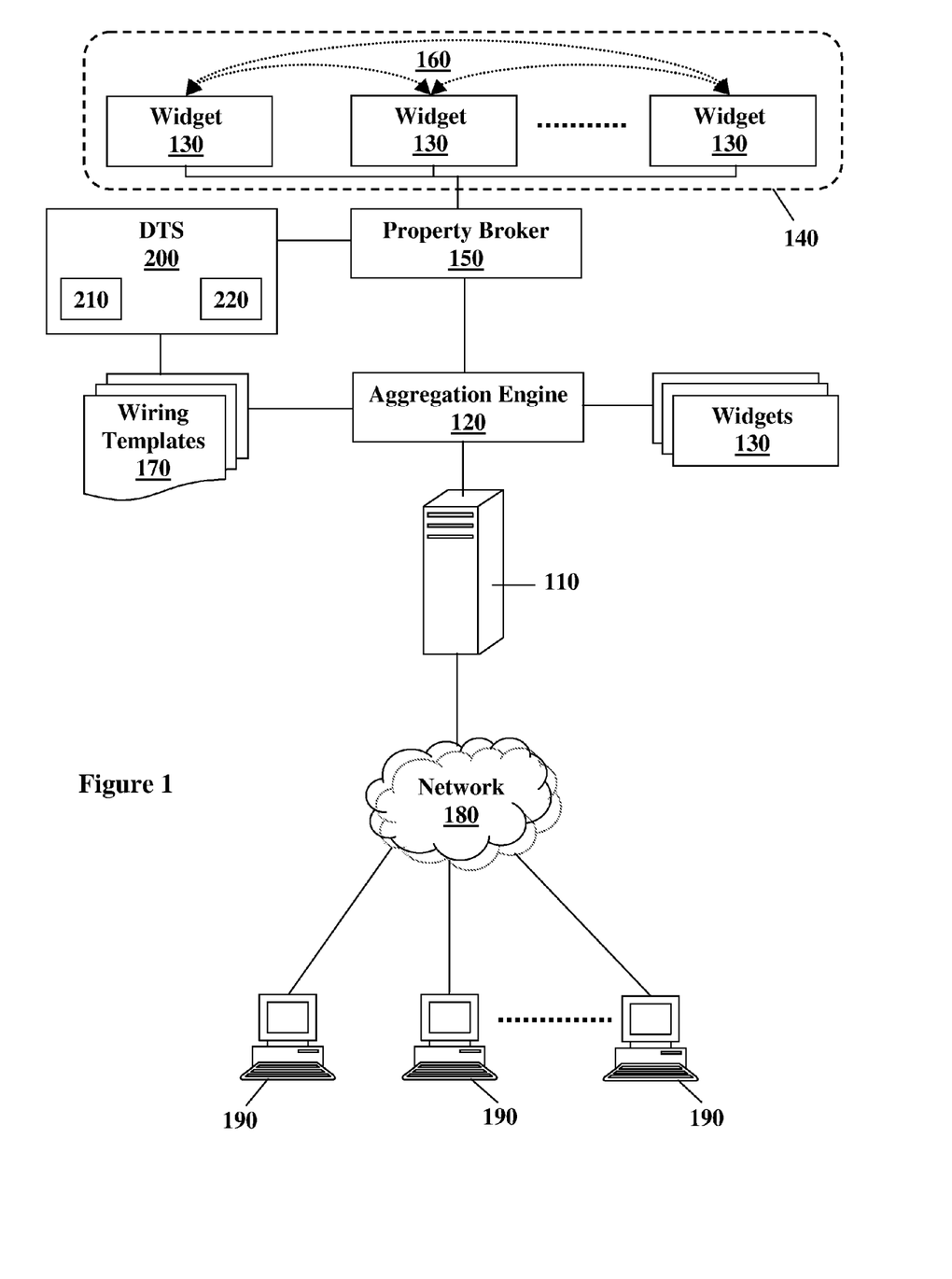
FIG. 1 is a block diagram illustrating an exemplary embodiment of a data processing system for wiring an assembly of widgets in a mashup application.

Referring now to FIG. 1, a block diagram illustrating an exemplary embodiment of a data processing system 100 for wiring an assembly of widgets in a mashup application is provided. Exemplary data processing system 100 includes a host computing platform 110 coupled to one or more client computing devices 190 over a computer communications network 180. Host computing platform 110 and clients 190 can each be implemented in the form of hardware and/or software. Host computing platform 110 can be operatively connected to one or more host data store(s) that can be employed to store information local to the host. Similarly, clients 190 can be operatively connected to one or more client data store(s) that can be employed to store information local to the clients. Network 180 can facilitate communications between host computing platform 110 and clients 190 by any suitable wired (including optical fiber) and/or wireless technology, including, but not limited to, local area networks (LANs), wireless networks, wide-area networks (WAN), the Internet (a network of heterogeneous networks using the Internet Protocol, IP), and virtual private networks.

According to the client-server model of computer process interaction utilized in the present exemplary embodiment, a client process sends a message including a request to a server process, and the server process responds by providing a service. The server process may also return a message with a response to the client process. Often the client process and server process execute on different computer devices, called hosts, and communicate via a network using one or more protocols for network communications. As used herein, the term "server" refers to the process that provides the service, or the host computer device on which the process operates. Similarly, as used herein, the term "client" refers to the process that makes the request, or the host computer device on which the process operates. In addition, a process executing as a server can be broken up to run as multiple servers on multiple hosts (sometimes called tiers) for reasons that include reliability, scalability, and redundancy, but not limited to those reasons.

Host computing platform 110 includes an aggregation engine 120 (which can include, for example, a mashup server providing a development application or utility for assembling mashup applications) enabled to provide a user interface for allowing a user to integrate one or more widgets 130 into a mashup application 140. Mashup application 140 can be implemented by aggregation engine 120 to provide a common runtime environment having a user interface that allows users of clients 190 to interact with an aggregated result of content surfaced by multiple widgets 130, as well as to provide cooperation and interaction among the content of widgets 130. The user interface provided by mashup application 140 can provide, for example, a common display structure that is rendered in a web browser as a web page representing the mashup to a user of a client device. Alternatively, mashup application 140 can produce RSS, web services, instant messages, or email messages, which are consumed by feed readers, rich applications, IM clients, or email clients respectively. In exemplary embodiments, cooperation among widgets can be facilitated using event-driven techniques that include a manual triggering of a publish/subscribe mechanism and an automated triggering thereof It should be noted, of course, the present embodiment is exemplary only, and that exemplary embodiments of the present invention can be applied in any suitable type of content integration system, and are not limited to application to systems for wiring an assembly of widgets in a mashup application. In alternative exemplary embodiments, aggregation engine 120 can include a composite application server enabled to generate a composite application of different components, which can include, for example, embedded browsers, Active X, web services, RCP, intelligent forms, host access, native Windows applications, portlets, web containers, etc. In other alternative exemplary embodiments, aggregation engine 120 can include a portal server enabled to generate a composite application of different portlets. In still other alternative exemplary embodiments, aggregation engine 120 can include a workplace server enabled to generate a collaborative environment of different collaborative services, such as instant messengers, chat rooms, shared documents, and the like.

In a typical application pattern, one of clients 190 will send a request for a page to aggregation engine 120, and in response, the aggregation engine will analyze the application model to determine the widgets the makeup mashup application 140, apply role-based access based on the identity of the user of the client device, retrieve the corresponding information to be presented, looks up the layout, and finally aggregate the content into a formatted page. It should be noted that while mashup application 140 is defined, described, and/or composed at the server side, in exemplary embodiments, widgets 130 could be aggregated (and thus instantiated) at the server side and/or the client side.

In the present exemplary embodiment, aggregation engine 120 is implemented to provide a development application or utility through a user interface that allows a user of one of clients 190 to assemble mashup application 140 by wiring widgets 130 together to establish a wiring scheme 160. Information can be exchanged among widgets 130 in the form of properties through connections between input properties and output properties of widgets 130 in wiring scheme 160 referred to as wires. A widget that provides a property is referred to as a source widget, a widget that receives a property is referred to as a target widget, the properties published by the source widget are referred to as output properties, and the properties that are received by a target widget are referred to as input properties. Generally, then, an output property is a typed exchangeable data item that a widget produces, and an input property is the logic for consuming an output property. The development application or utility provided by aggregation engine 120 can allow a user to, for example, declare widgets to be source widgets or target widgets, define data to be published as an output property, define data to be received as an input property, add a trigger action for data consumed by a target widget, interconnect an output property and an input property by creating a wire, and bind data transmitted over a wire to the operations of a property broker module 150.

To define a wire between two properties, aggregation engine 120 can allow a user to specify the input and output property endpoints of the wire. For example, this may involve specifying, for each property, the property's namespace, the property's name, the property's data type, and an identification of the widget publishing or receiving the property. This information can be maintained by aggregation engine 120 using, for example, a WSDL file. In exemplary embodiments, the user interface of the development application or utility provided by aggregation engine 120 can be implemented as a graphical user interface that provides a visual presentation of widgets 130 within mashup application 140 laid out as a set of user interface rectangles having well-defined entry and exit points representing the properties for the user during assembly. In these embodiments, aggregation engine can be implemented to provide a widget wiring tool that enables the user to operate on the visual presentation to create wires between the input and output properties of widgets 130.

Once mashup application 140 is established by aggregation engine 120, wiring scheme 160 can be maintained for widgets 130 of mashup application 140 through property broker module 150. Mashup application 140 is based upon declarative communication between pairs of widgets 130, and property broker enables this communication the widgets. Property broker 150 provides a framework for registration, wiring, and communication between decoupled widgets. More particularly, widgets 130 subscribe to a model for declaring, publishing, and sharing their defined interface information with one another using property broker 150. The documentation on each widget can include a list of the output properties the widget publishes, a list of the input properties the widget consumes, and the effects of setting values according to the input properties consumed. Each of widgets 130 can subscribe to property broker 150 by publishing the properties that can be shared by the widget, either as a provider or as a recipient.

Wiring scheme 160 can enable properties to be shared between source and target widgets wired together with a causal relationship via property broker 150. At runtime of mashup application 140, property broker 150 can match the output properties from a source widget with the input properties from one or more target widgets coupled to the source widget over separate wires so that the property can be shared.

The actual transfer of the property over a wire can be initiated through the use of a widget-wiring tool, or by establishing a click-to-action event for the source widget. Property broker 150 detects the output property and invokes the corresponding one or more input properties, which are connected by wires to the output property as defined in wiring scheme 160. Property broker 150 can allow for actions to be defined for target widgets that are triggered whenever a property value is received by an input property. In exemplary embodiments, the declaration, publishing, and interface information of widgets 130 can be defined in XML format, and property broker 150 is driven by declarative markup.

In the present exemplary embodiment, a data transformation service module 200 is coupled to property broker 150 and includes program code configured to enable automatic transformation of property values being transferred over the wires of wiring scheme 160 of mashup application 150 during runtime. Data transformation service 200 can thereby eliminate the requirement that both endpoints of a wire from an output property of a source widget to an input property of a target widget use the same data type. As illustrated in FIG. 1, data transformation service 200 includes a static transformation module 210 and a dynamic transformation module 220. Static transformer 210 is configured to perform transformation of property values being transferred over wires based on user input provided upon creation of the wires. Dynamic transformer 220 is configured to perform transformation of property values being transferred over wires at runtime based on a semantic analysis of the two properties that participate in the wire.

In the present exemplary embodiment, aggregation engine 120 is further implemented to allow a user of one of clients 190, when assembling mashup application 140 by wiring widgets 130 together to establish wiring scheme 160, to define how the input property and the output property for each wire being formed can be divided into atomic sub-units. As will be described in greater detail below, this user input is utilized by static transformer 210 and dynamic transformer 220 in performing transformation of property values.

More particularly, the user interface provided by aggregation engine 120 allows a user to define each of the sub-units for each property as an ordered sequence of symbols having a string data type. Aggregation engine 120 can permit a user to define the atomic sub-units of a property using, for example, the more fine-grained attributes of the property (for instance, an Address property having a string data type could be divided into sub-unit strings for "Line 1", "Line 2", "State", and "Zip Code" of the value of the Address property), a regular expression-based description identifying inherent data of the property in terms of such as particular characters, words, or patterns of characters (for instance, a Date property can be specified according to a two-digit string for a day, a two-digit string for a month, and a four-digit string for a year), and fixed value strings that should be, for instance, prepended to the output property, appended to output property, removed from the output property, or used to operate on the output property in deriving the values for the sub-units.

Once both the input and output properties for a wire connection between two widgets have been defined in terms of atomic sub-units, data transformation service 200 is configured to utilize either user-supplied or dynamically generated transformation logic for performing both basic and more advanced data transformations on the values for the sub-units of the output property values being transferred along the wire to arrive at the values for sub-units of the input property values. Basic data transformations can involve simple transformation operations such as data type conversion, while advanced data transformations can involve more detailed transformation operations such as formatting a string value (for example, transforming the format of a Date property from 'DD/MM/YYYY' to 'YYYY/DD/MM'or selecting a only subset of a Date property value such as 'DD').

Figure 2A:
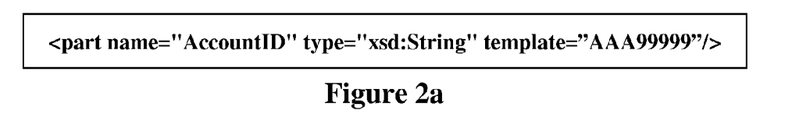
FIGS. 2a-2c are sample wiring template code sets defining the atomic sub-units of example properties.
Figure 2B:
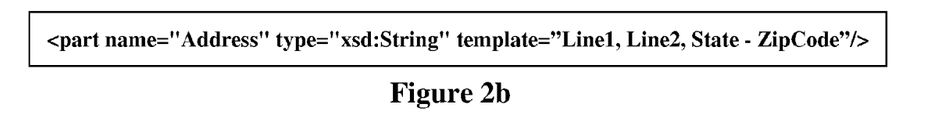
Figure 2C:
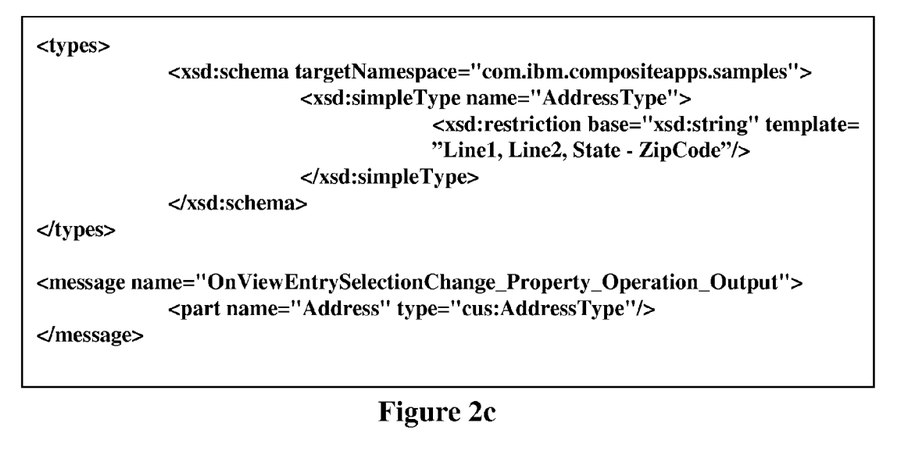

The user interface element provided by aggregation engine 120 can be configured to accept the sub-unit definitions for the properties of each wire of wiring scheme 160 according to the user input and to maintain these definitions along with any provided static transformation logic for each wire in programming code for a set of wiring templates 170 for mashup application 140. Wiring templates 170 can include sub-unit definitions and transformation logic for each wire defined in wiring scheme 160. As an example, if the code for wiring templates 170 is provided in an XML-programming language, the wiring template code defining the atomic sub-units of an AccountID property published using a string value having a format of three letter character and four number characters in terms of a regular expression-based description could be written using the sample code set provided in FIG. 2a. In another example where the code for wiring templates 170 is provided in an XML-programming language, the wiring template code defining the atomic sub-units of an Address property published using a string value having comma-separated format in terms of the more fine-grained attributes of the property could be written using the sample code set provided in FIG. 2b. For a property that is defined in terms of a more complex data type such as a custom, composite, recursive, or abstract data type, rather than a primitive or simple data type, the wiring template code defining the atomic sub-units of the property could be written at the ontological level to provide a formal representation of a set of concepts about the properties and the relationships between those concepts. As an example, if the code for wiring templates 170 is provided in an XML-programming language, the wiring template code defining the atomic sub-units of an Address property published using a custom data type could be written using the XML schema of the sample code set provided in FIG. 2c.

Figure 3A:
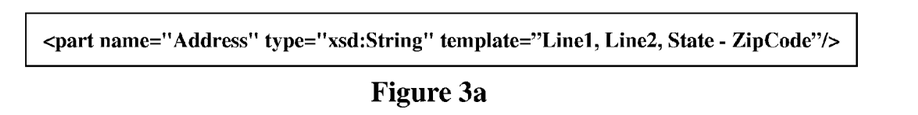
FIGS. 3a-3c provide sample wiring template code sets defining the atomic sub-units of two example properties and a sample transformation logic code set for the wire between the two example properties.
Figure 3B:
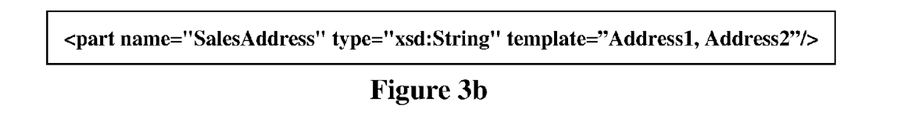
Figure 3C:
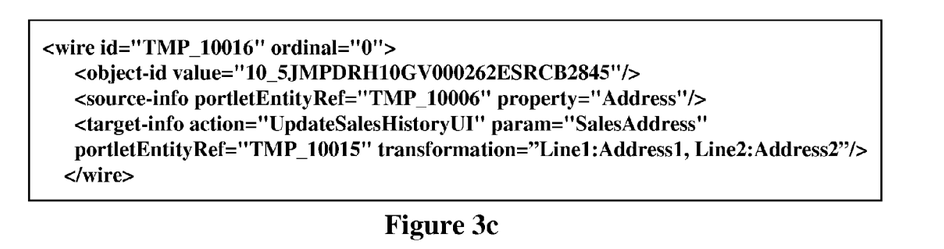

Wiring templates 170 can be maintained by aggregation engine 120 on host computing platform 110 for mashup application 140. The user interface element provided by aggregation engine 120 can also be configured to provide the user with an option to specify the static transformation logic for the properties of each wire of wiring scheme 160. For each wire for which the user elects to specify transformation logic, aggregation engine 120 can be configured to direct system 100 to maintain the static transformation logic in the programming code of wiring templates 170. As an example, if the code for wiring templates 170 is provided in an XML-programming language, where the wiring template code defining the atomic sub-units of an Address output property published for a first widget is provided as the sample code set depicted in FIG. 3a and the wiring template code defining the atomic sub-units of a Sales Address input property published for a second widget connected to the output property of the first widget is provided as the sample code set depicted in FIG. 3b, the static transformation logic for the wire between the output property of the first widget and the input property of the second widget can be provided as the sample code set depicted in FIG. 3c. In exemplary embodiments, for each wire of wiring scheme 160, aggregation engine 120 can further be configured to provide the user with an option to direct data transformation services 200 to perform a semantic analysis of the output property of the of the source widget and the input property of the target widget to generate recommendations for the transformation logic from which the user can select a recommendation to use as the static transformation logic.

During runtime for mashup application 140, a property publish event is caused by each transmission of a value from an output property from one widget over a wire of wiring scheme 160 to an input property of another widget via property broker 150. Before providing the output property value to the input property, property broker 150 is configured to invoke data transformation service 200 to perform any needed data transformation so that the property value can be accepted by the input property. Where static transformation logic has been provided for the wire in wiring templates 170, static transformer 210 is able to perform static transformation of the property value being transferred over the wire by breaking the property value into the sub-units defined for the output property, performing the static transformation based on the logic supplied by the user upon creation of the wire to arrive at the sub-units defined for the input property, and integrating the input property sub-units to transform the value into the data type format acceptable for passing to the input property. On the other hand, where static transformation logic has not been provided for the wire in wiring templates 170, dynamic transformer 220 can perform an "on-the-fly" transformation of the property value being transferred over the wire based on a semantic analysis of the semantic information associated with two properties that participate in the wire such as, for example, semantic information associated with the data types of the two participating properties as well as the sub-unit definitions as provided for the two properties in wiring templates 170.

The semantic analysis performed by dynamic transformer 220 utilizes the meanings of the terms used in the metadata associated with the two properties in performing logical reasoning based on any number of suitable ontological approaches to derive the dynamic transformation logic for the two properties. These ontological approaches can utilize, for example, metadata discovery techniques, as well as tools provided in knowledge representation languages for authoring ontologies such as Resource Definition Framework (RDF) resources and the Web Ontology Language for Services (OWL-S) representations. In exemplary embodiments, the meanings for and similarities between the sub-units of the two properties can be inferred using domain theoretical, linguistic semantic, and/or denotational semantic techniques.

Figure 4A:
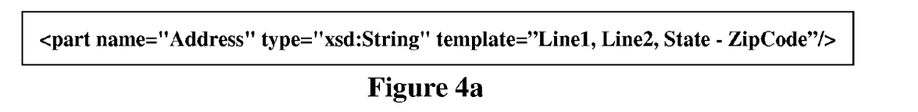
FIGS. 4a-4c provide sample wiring template code sets defining the atomic sub-units of two example properties and an illustration of an example representation of a semantic attribute equivalence mapping between the two properties.
Figure 4B:
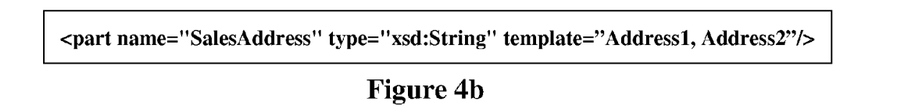

As an example, if the code for wiring templates 170 is provided in an XML-programming language, where the wiring template code defining the atomic sub-units of an Address output property published for a first widget is provided as the sample code set depicted in FIG. 4a and the wiring template code defining the atomic sub-units of a Sales Address input property published for a second widget connected to the output property of the first widget is provided as the sample code set depicted in FIG. 4b, the semantic analysis performed by dynamic transformer 220 can deduce the similarities between the two properties by determining the inherent meanings of the related metadata between the data types and the sub-unit definitions provided for the two participating properties in wiring templates 170.

Figure 4C:
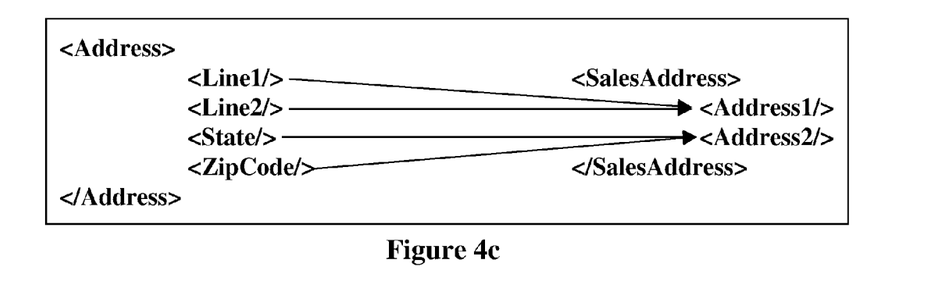

Once these similarities have been deduced, dynamic transformer 220 can use the identified similarities generate a mapping representing the semantic attribute equivalences between the atomic sub-units defined for the two properties using, for example, metadata registries, lexical analysis techniques, schema-mapping techniques, and/or semantic integration techniques. A semantic attribute equivalence is a statement that two attributes have similar meaning. The mapping does not necessarily need to be a one-to-one mapping for the sub-units. For instance, a sub-unit of the output property may map to several sub-units of the input property. Referring again to the example involving the sample code sets provided in FIGS. 4a and 4b, while the data types for the two properties are conceptually similar, they differ in property names and sub-unit definitions. FIG. 4c illustrates an example representation of the semantic attribute equivalence mapping between the two properties of the example involving the sample code sets provided in FIGS. 4a and 4b.

Once the mapping between the atomic sub-units defined for the two properties involved in a runtime transmission of a property value over a wire of wiring scheme 160 has been generated, dynamic transformer 220 generate the dynamic transformation logic for performing a vocabulary-based transformation using the generated semantic attribute equivalence mapping. Dynamic transformer 220 can then execute the dynamic transformation logic generated on-the-fly to transform the format of the property value transmitted from the output property into a format that can be accepted by the input property based on the mapping between the atomic sub-units, breaking the property value into the sub-units defined for the output property, performing transformation of the sub-units for the property value based on the dynamic transformation logic generated to arrive at the sub-units defined for the input property, and integrating the input property sub-units to transform the value into the data type format acceptable for passing to the input property.

In exemplary embodiments, dynamic transformer 220 can employ a semantic mapper tool to aid in generating the logic for transforming of the sub-units of the output property to the sub-units of the input property. The semantic mapper tool can be configured to receive the list of sub-units and associated metadata for the output property, the list of sub-units and associated metadata for the output property, and the mapping of the semantic attribute equivalences between the sub-units of the two properties, and to successively transform the sub-units of the output property to the sub-units of the input property. The transformation logic output by the semantic mapper tool can be any transformation module such as XSLT-language program, a Java program, or a program in some other procedural language.

Figure 5:
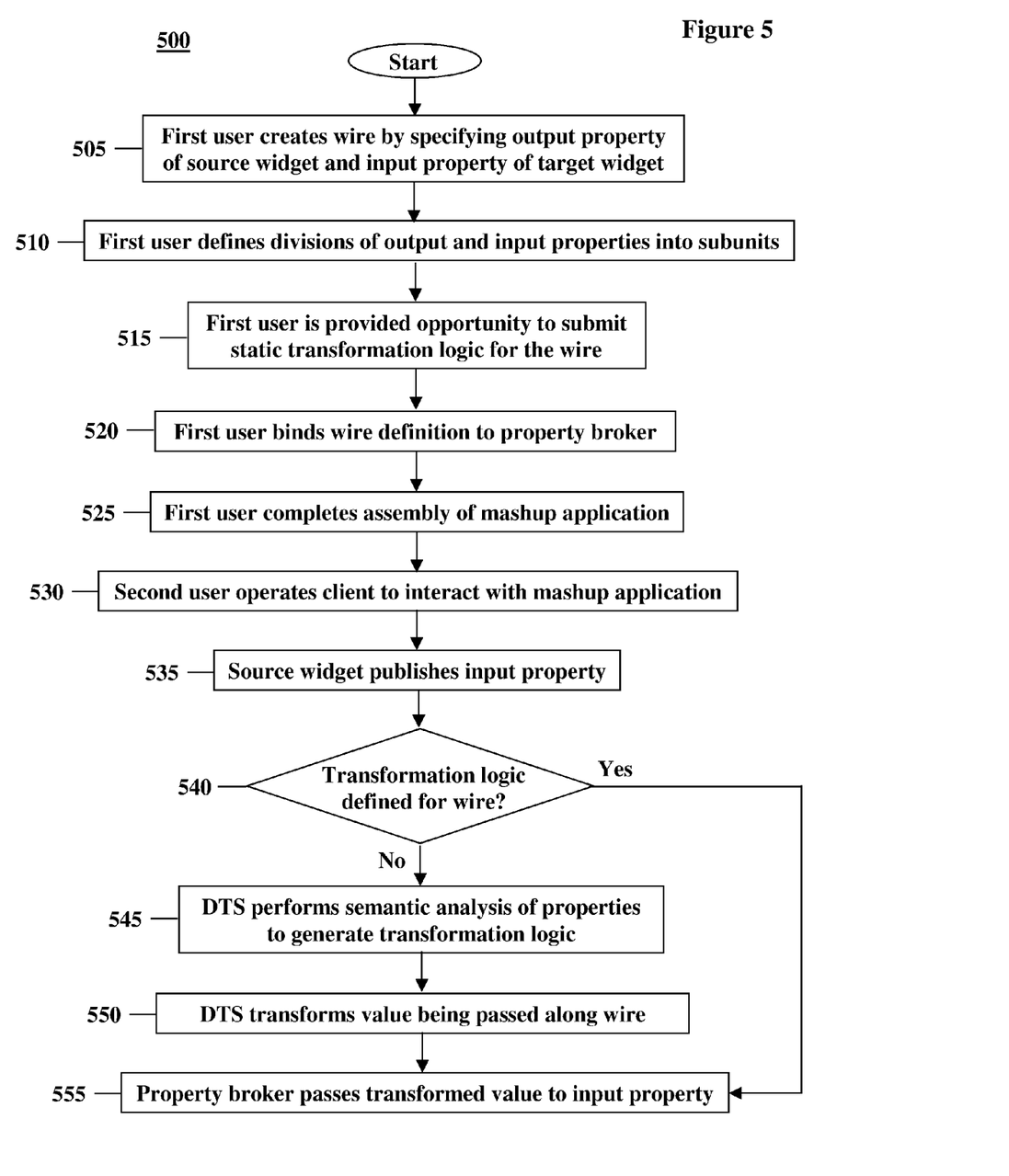
FIG. 5 is a flow diagram illustrating an exemplary embodiment of a process for defining a wire between two properties having disparate data types and performing data transformation on a data value transferred over the wire.

Referring now to FIG. 5, a flow chart illustrating an exemplary embodiment of a process 500 for defining a wire between properties of two widgets during assembly of a mashup application that are associated with different data types and performing data transformation on a data value transferred over the wire during runtime of the mashup application in accordance with the present invention is provided. At block 505 of exemplary process 500, a first user assembling the mashup application using a mashup development utility creates the wire by specifying an output property of a source widget and an input property of a target widget as the endpoints of the wire. Creating the wire may further involve first user specification of each property's namespace, each property's name, each property's data type, and an identification of the widget publishing or receiving each property. At block 510, the first user defines how the input property and the output property for the wire being formed can be divided into atomic sub-units. At block 515, the first user is provided with an opportunity to submit static transformation logic for transforming values in the format published by the input property to the format accepted by the output property. At block 520, the first user binds the wire definition to a property broker in the mashup application assembly. At block 525, the first user completes assembly of the mashup application, which is now available on a mashup application server for access by users of client devices.

In exemplary process 500, at block 530, a second user operates a client device to access the mashup application server and interact with the mashup application. At block 535, the source widget publishes the input property during runtime of the second user's interaction with the mashup application. At decision block 540, the property broker determines whether static transformation logic was defined by the first user at block 515 for the wire between the output property of the source widget and the input property of the target widget during assembly of the mashup application. At block 545, if static transformation logic was not defined by the first user at block 515 for the wire, the property broker calls a data transformation service to perform a semantic analysis of the metadata associated with the input and output properties that participate in the wire to dynamically generate transformation logic for the value being transferred along the wire. At block 550, the property broker call the data transformation service to transform the value being transferred along the wire according to either the static transformation logic defined at block 515 or the dynamic transformation logic generated at block 545. At block 555, the property broker complete the transfer along the wire by passing the transformed value to the input property of the target widget.

Exemplary embodiments of the present invention can be configured for incorporation within any suitable content aggregation application development tool or utility as a plug-in, add-on, or extension supported by the server system or client systems. As used herein, the term "plug-in" can refer is a software application or module program, or one or more computer instructions, which may or may not be in communication with other software applications or modules, that interacts with a host application to provide specified functionality, and which may include any file, image, graphic, icon, audio, video, or any other attachment.

In the preceding description, for purposes of explanation, numerous specific details are set forth in order to provide a thorough understanding of the described exemplary embodiments. Nevertheless, one skilled in the art will appreciate that many other embodiments may be practiced without these specific details and structural, logical, and electrical changes may be made.

Some portions of the exemplary embodiments described above are presented in terms of algorithms and symbolic representations of operations on data bits within a processor-based system. The operations are those requiring physical manipulations of physical quantities. These quantities may take the form of electrical, magnetic, optical, or other physical signals capable of being stored, transferred, combined, compared, and otherwise manipulated, and are referred to, principally for reasons of common usage, as bits, values, elements, symbols, characters, terms, numbers, or the like. Nevertheless, it should be noted that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

Exemplary embodiments of the present invention can be realized in hardware, software, or a combination of hardware and software. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following (a) conversion to another language, code or, notation; and (b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface including a wired network or a wireless network that allow a computer system to read such computer readable information.

Figure 6:
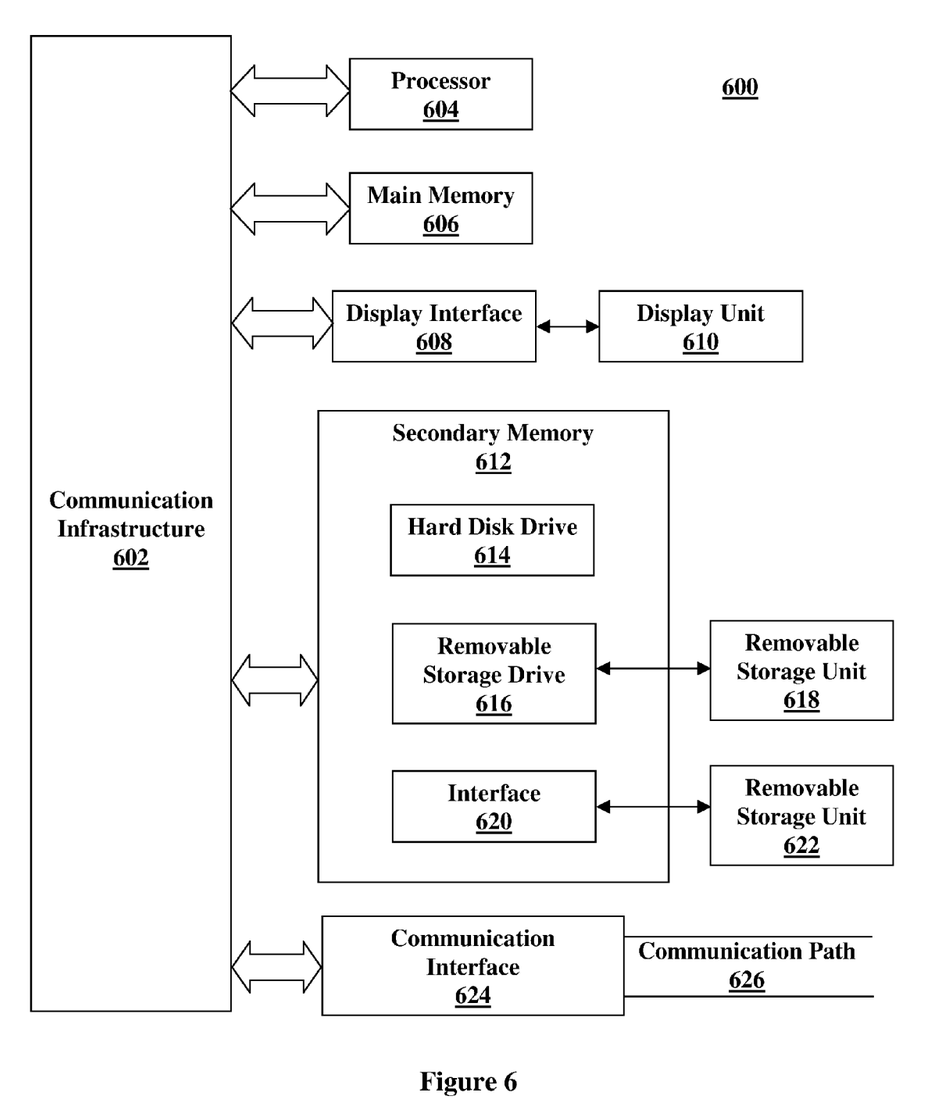
FIG. 6 is a block diagram illustrating an exemplary computer system that can be used for implementing exemplary embodiments of the present invention.

FIG. 6 is a block diagram of an exemplary computer system 600 that can be used for implementing exemplary embodiments of the present invention. Computer system 600 includes one or more processors, such as processor 604. Processor 604 is connected to a communication infrastructure 602 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 600 can include a display interface 608 that forwards graphics, text, and other data from the communication infrastructure 602 (or from a frame buffer not shown) for display on a display unit 610. Computer system 600 also includes a main memory 606, which can be random access memory (RAM), and may also include a secondary memory 612. Secondary memory 612 may include, for example, a hard disk drive 614 and/or a removable storage drive 616, representing a floppy disk drive, a magnetic tape drive, an optical disk drive, etc. Removable storage drive 616 reads from and/or writes to a removable storage unit 618 in a manner well known to those having ordinary skill in the art. Removable storage unit 618, represents, for example, a floppy disk, magnetic tape, optical disk, etc. which is read by and written to by removable storage drive 616. As will be appreciated, removable storage unit 618 includes a computer usable storage medium having stored therein computer software and/or data.

In exemplary embodiments, secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between the computer system and external devices. Examples of communications interface 624 may include a modem, a network interface (such as an Ethernet card), a communications port, a PCMCIA slot and card, etc. Software and data transferred via communications interface 624 are in the form of signals which may be, for example, electronic, electromagnetic, optical, or other signals capable of being received by communications interface 624. These signals are provided to communications interface 624 via a communications path (that is, channel) 626. Channel 626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 606 and secondary memory 612, removable storage drive 616, a hard disk installed in hard disk drive 614, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface including a wired network or a wireless network that allow a computer to read such computer readable information.

Computer programs (also called computer control logic) are stored in main memory 606 and/or secondary memory 612. Computer programs may also be received via communications interface 624. Such computer programs, when executed, can enable the computer system to perform the features of exemplary embodiments of the present invention as discussed herein. In particular, the computer programs, when executed, enable processor 604 to perform the features of computer system 600. Accordingly, such computer programs represent controllers of the computer system.

Although exemplary embodiments of the present invention have been described in detail, the present description is not intended to be exhaustive or limiting of the invention to the described embodiments. It should be understood that various changes, substitutions and alterations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

The exemplary embodiments presented herein were chosen and described to best explain the principles of the present invention and the practical application, and to enable others of ordinary skill in the art to understand the invention. It will be understood that those skilled in the art, both now and in the future, may make various modifications to the exemplary embodiments described herein without departing from the spirit and the scope of the present invention as set forth in the following claims. These following claims should be construed to maintain the proper protection for the present invention.

The invention claimed is:

1. A method of sharing data between wired properties associated with disparate data types, the method comprising:
    receiving a first specification for dividing data items having a first data type published by an output property of a first service task into a first set of atomic sub-units and a second specification for dividing data items having a second data type consumed an input property of a second service task into a second set of atomic sub-units, the first and second service tasks being registered with a property broker coupled to a content aggregation application aggregating the first and second service tasks, the property broker further coupling to a wiring scheme for the content aggregation application that includes a wire between the output property and the input property;
    receiving a set of transformation logic for transforming data items divided into the first set of sub-units to data items divided into the second set of sub-units;
    dividing a first data item published over the wire by the output property into the first set of sub-units;
    automatically applying the set of transformation logic to transform the first item divided into the first set of sub-units to a second data item divided into the second set of sub-units;
    joining the divided second data item based on the second data type; and
    passing the second data item over the wire to the input property.

2. The method of claim 1, wherein receiving the set of transformation logic comprises providing an option to specify the set of transformation logic via a first user interface implemented by an application development tool being operated to assemble the content aggregation application.

3. The method of claim 2, wherein receiving the set of transformation logic further comprises receiving the set of transformation logic via the first user interface if the option to specify the set of transformation logic is selected.

4. The method of claim 2, wherein receiving the set of transformation logic further comprises performing a semantic analysis of metadata associated with the output property and the input property upon the first data item being published over the wire to generate the set of transformation logic if the option to specify the set of transformation logic is not selected.

5. The method of claim 4, wherein the metadata associated with the output property and the input property includes metadata associated with the first and second data types, metadata associate with the first specification for dividing data items having the first data type into the first set of sub-units, and metadata associated the second specification for dividing data items having the second data type into the second set of sub-units.

6. The method of claim 5, wherein performing a semantic analysis of metadata associated with the output property and the input property comprises identifying semantic similarities between the sub-units of the first set of sub-units and the sub-units of the second set of sub-units, generating a mapping of semantic attribute equivalences between the sub-units of the first set of sub-units and the sub-units of the second set of sub-units based on the identified semantic similarities, and generating the set of transformation logic based on the mapping of semantic attribute equivalences.

7. The method of claim 6, wherein generating the set of transformation logic based on the mapping of semantic attribute equivalences is performed by a semantic mapper tool.

8. The method of claim 2, wherein receiving the set of transformation logic further comprises performing a semantic analysis of metadata associated with the output property and the input property to generate one or more recommendations for the set of transformation logic if the option to specify the set of transformation logic is selected, providing a second option to specify one of the one or more recommendations for the set of transformation logic via a first user interface, and receiving the specified one of the one or more recommendations as the set of transformation logic if the second option is selected.

9. The method of claim 1, wherein a data transformation service module is called by the property broker to automatically apply the set of transformation logic to transform the first item divided into the first set of sub-units to a second data item divided into the second set of sub-units.

10. The method of claim 1, wherein the content aggregation application is a composite application, and wherein the first and second service tasks are atomic application components.

11. The method of claim 1, wherein the content aggregation application is a portal application, and wherein the first and second service tasks are atomic portlets.

12. The method of claim 1, wherein the content aggregation application is a workplace application, and wherein the first and second service tasks are atomic collaborative services.

13. The method of claim 1, wherein the content aggregation application is a mashup application, and wherein the first and second service tasks are atomic widgets.

14. The method of claim 13, wherein the mashup application is selected from websites, web 2.0 applications, and web services.

15. The method of claim 2, wherein the option to specify the set of transformation logic via a first user interface implemented by an application development tool is provided upon creation of the wire between the output property and the input property using a wiring tool implemented within the application development tool.

16. The method of claim 2, wherein receiving the set of transformation logic via the first user interface further comprises storing the set of transformation logic in a wiring template for the wire that includes a definition of the wire.

17. The method of claim 16, wherein the wiring template is coded in an XML programming language.

18. The method of claim 1, wherein each sub-unit of the first and second sets of sub-units is specified as a string data type.

19. A computer-usable medium having computer readable instructions stored thereon for execution by a processor to perform a method of sharing data between wired properties associated with disparate data types, the method comprising:
receiving a first specification for dividing data items having a first data type published by an output property of a first service task into a first set of atomic sub-units and a second specification for dividing data items having a second data type consumed an input property of a second service task into a second set of atomic sub-units, the first and second service tasks being registered with a property broker coupled to a content aggregation application aggregating the first and second service tasks, the property broker further coupling to a wiring scheme for the content aggregation application that includes a wire between the output property and the input property;
receiving a set of transformation logic for transforming data items divided into the first set of sub-units to data items divided into the second set of sub-units;
dividing a first data item published over the wire by the output property into the first set of atomic sub-units;
automatically applying the set of transformation logic to transform the first item divided into the first set of atomic sub-units to a second data item divided into the second set of atomic sub-units;
joining the divided second data item based on the second data type; and
passing the second data item over the wire to the input property.

20. A data processing system comprising:
at least one processor;
a random access memory for storing data and programs for execution by the at least one processor; and
computer readable instructions stored in the random access memory for execution by the at least one processor to perform a method of sharing data between wired properties associated with disparate data types, the method comprising:
receiving a first specification for dividing data items having a first data type published by an output property of a first service task into a first set of atomic sub-units and a second specification for dividing data items having a second data type consumed an input property of a second service task into a second set of atomic sub-units, the first and second service tasks being registered with a property broker coupled to a content aggregation application aggregating the first and second service tasks, the property broker further coupling to a wiring scheme for the content aggregation application that includes a wire between the output property and the input property;
receiving a set of transformation logic for transforming data items divided into the first set of sub-units to data items divided into the second set of sub-units;
dividing a first data item published over the wire by the output property into the first set of atomic sub-units;
automatically applying the set of transformation logic to transform the first item divided into the first set of atomic sub-units to a second data item divided into the second set of atomic sub-units;
joining the divided second data item based on the second data type; and
passing the second data item over the wire to the input property.

* * * * *